(No Model.) 2 Sheets—Sheet 1.
J. J. FRAIKIN.
CHECK ROW CORN PLANTER AND FERTILIZER DISTRIBUTER.
No. 337,759. Patented Mar. 9, 1886.
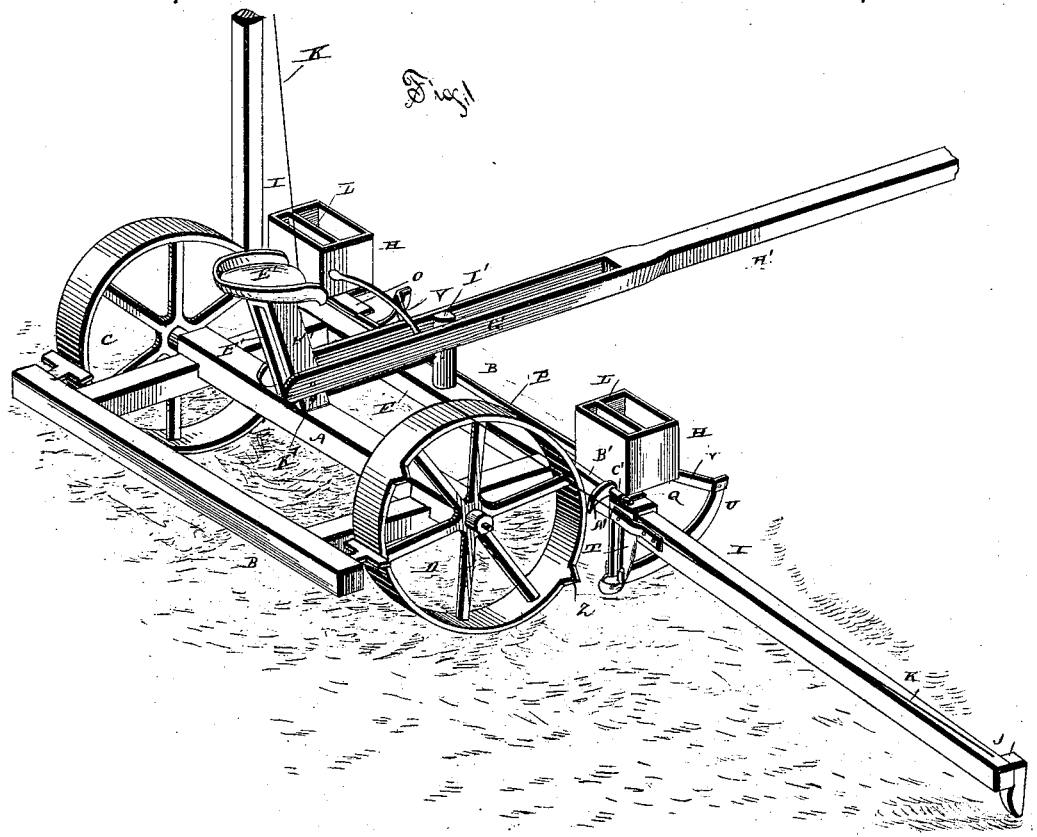
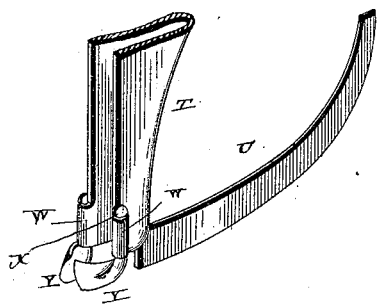
WITNESSES
F. L. Ourand
Edward Stanton
John Joseph Fraikin
INVENTOR
By Louis Bagger & Co.
Attorneys

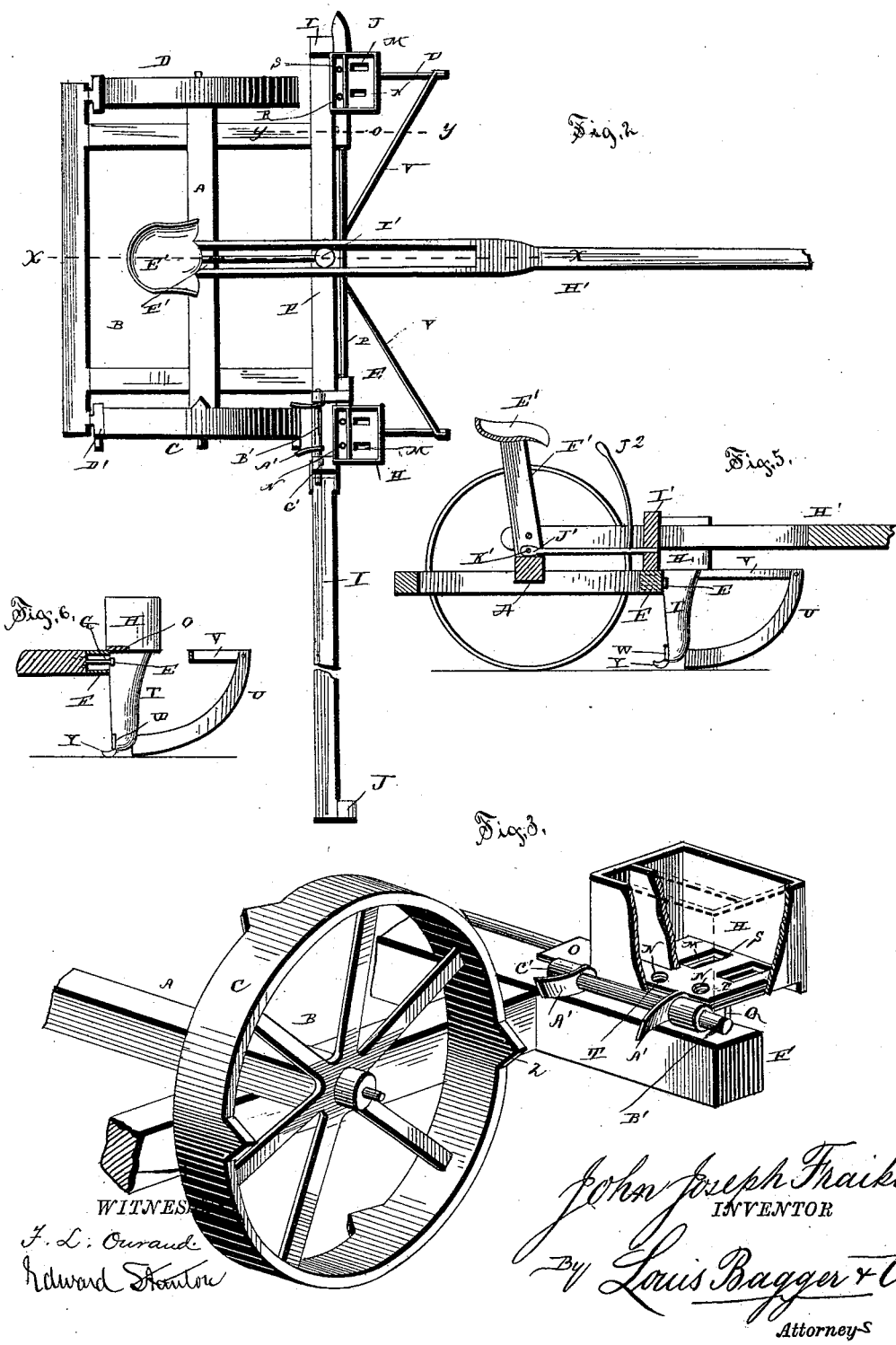

UNITED STATES PATENT OFFICE.

JOHN JOSEPH FRAIKIN, OF FORT WAYNE, INDIANA.

CHECK-ROW CORN-PLANTER AND FERTILIZER-DISTRIBUTER.

SPECIFICATION forming part of Letters Patent No. 337,759, dated March 9, 1886.

Application filed November 25, 1885. Serial No. 183,755. (No model.)

*To all whom it may concern:*

Be it known that I, JOHN JOSEPH FRAIKIN, a citizen of the United States, and a resident of Fort Wayne, in the county of Allen and State of Indiana, have invented certain new and useful Improvements in Check-Rowers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved check-row corn-planter and fertilizer-distributer. Fig. 2 is a top view of the same. Fig. 3 is a perspective detail view of a portion of the cam-wheel and the seed-slide and seed-box, showing parts of the seed-box broken away. Fig. 4 is a similar view of the lower end of one of the seed-tubes, showing the pivoted covering-wings. Fig. 5 is a vertical sectional view taken on line $xx$, Fig. 2, of the drawings; and Fig. 6 is a vertical sectional view taken on line $yy$, Fig. 2, of the drawings.

Similar letters of reference indicate corresponding parts in all the figures.

My invention has relation to that class of check-row corn-planters and fertilizer-distributers in which two arms are pivoted at the sides of the planter-frame provided with marking-shoes at their ends, which, by dragging upon the ground, may mark the next row to be planted, and to that class of planters having cams upon the wheel, which operate the seed-slide; and it consists in the improved construction and combination of such a planter, which contemplates certain improvements upon the corn-planter for which Letters Patent No. 270,049 were granted to me on the 2d day of January, 1883, as hereinafter more fully described and claimed.

In the accompanying drawings, the letter A indicates the main axle, to which is secured the rectangular planter-frame B, and upon the ends of which the drive-wheels C and D are journaled. The forward ends of the side pieces of the frame are provided with projecting bolts E E, upon which a cross-bar, F, is secured, having two vertical slots, G G, near its ends, which slide upon the bolts, as clearly shown in the detail view, Fig. 6, of the drawings, and the seed-boxes H H are secured upon the ends of this cross bar or beam. The marker-arms I I are pivoted to swing in a vertical plane upon the ends of this cross-beam, and the outer ends of these arms are provided with marking-shoes J, which by dragging over the ground will mark the row next to be planted, and each marker-arm is provided with a cord or chain, K, attached to the outer end of the arm and to the seat of the driver or other portion of the frame, serving to raise the arms when desired.

The seed-boxes are divided transversely by means of partitions L into a larger and a smaller compartment, the larger compartment being the fertilizer-receptacle and the smaller compartment being the corn-receptacle, and the bottoms of these compartments are formed with apertures M and N, through which the fertilizer or corn may pass out of the box. The seed-slides O O are secured at the ends of a slide-bar, P, and slide in bearings Q upon the cross beam under the seed-boxes, having perforations R and S registering with the apertures in the bottoms of the boxes; and the seed-tubes T are attached, projecting downward to the cross beam under the apertures in the seed-boxes. The lower ends of the seed-tubes are secured to the heels of the runners U, which open the furrows for the reception of the grain, and the upwardly-curved ends of these runners are secured to braces V, which are secured at the middle of the cross-beam. The lower ends of the seed-tubes have vertical bearings or sockets W at their rear open edges, and the upwardly-projecting stems X of two covering-wings, Y Y, are journaled in these sockets, turning in all directions. These wings are formed with their forward corners rounded and with their lower edges curved outward and flaring at the rear ends, so that the wings will form a raised row over the dropped corn and fertilizer, and being pivoted so as to swing similar to caster-wheels, they may turn out of the way of stones, clods, or similar obstructions, and at the same time turn when the planter is turned to one side or the other, continuing the raised row without dragging. One of the drive-wheels C is provided at equal distances at alternating edges with triangular cam-projections or lips Z, which may engage and bear against two lips, A' A', upon a short bar, B', journaled in bearings C' upon the seed-slide at that end of the cross-beam, and these lips are either inclined or beveled, so as to present inclined surfaces for the cam-projections to strike as the wheel is revolved. A scraper, D', is secured to the cross-beam at its rear side and bears against the rim of the wheel, cleaning the wheel from any soil which may adhere to it.

The seat E' for the driver is secured upon the upper ends of two rearwardly-inclined uprights, F' F', upon the axle, and the inner bifurcated or slotted end, G', of the tongue H' is pivoted to the lower ends of these two uprights, and an upright, I', projects from the middle of the cross-beam, and projects into the slot at the inner end of the tongue.

J' represents an arm or lever, (shown more clearly in Fig. 5 of the drawings), the forward end of which is secured to the upright I', while its rear end is pivoted between the lower ends of the seat uprights F' F', upon a bolt, K', and the arm or lever J' is provided near its forward end with an upwardly-projecting operating-handle, J², extending within convenient reach of the driver's seat, and it will be seen that, by pulling upon the upper end of this handle J², the lever will turn on its pivotal point K', thereby raising the front cross-bar, F, and the runners U, the vertical slots G G, in the cross-bar F, through which the bolts E E at the front ends of the side pieces of the frame B project, permitting of the cross-bar being thus adjusted in a vertical plane. In this manner it will be seen that the runners may be raised out of the way of obstructions, and that they also may be forced down into the ground, if the soil is hard or heavy; and it will be seen that as the cam-wheel revolves the projections upon the same will alternately strike the rearwardly-projecting lips upon the seed-slide, alternately throwing it to one side and the other, and when it is desired to disengage the seeding mechanism the rock-shaft, upon which the lips are secured, may be turned in its bearings upon the seed-slide and the lips thrown out of engagement with the projections upon the cam-wheel. The markers will operate in the usual manner, one arm being thrown out at the time to the side where the next row is to be, and the marker-shoe will trace a furrow in the soil, which is to be followed by the runner at the next row. The covering-wings will be capable of swinging to either side, so that they may escape any obstructions in the ground, and they may also swing so as to continue to form a raised row when the planter is turned to one side or the other, instead of dragging the furrow out, as fixed covering-wings would be liable to do, so that planting may be continued while making comparatively short turns.

Having thus described my invention, I claim and desire to secure by Letters Patent of the United States—

1. In a seeding-machine, the combination with a seed-tube and runner or furrow-opener, of two covering-wings pivoted with vertical shafts upon the rear side of the lower end of the seed-tube and having the wings dragging rearward with their lower edges upon the ground, as and for the purpose shown and set forth.

2. In a seeding-machine, the combination with a seed-tube having a furrow-opener and formed with two vertical sockets at the edges of its rearwardly-opening lower end, of two covering-wings having vertical shafts at their forward ends turning in the sockets, and having their forward corners rounded and their lower and rear edges flaring, as and for the purpose shown and set forth.

3. In a seeding-machine, the combination of a frame having a cross-beam at its forward end provided with seed-boxes having two compartments, the smaller of the two for the seed-corn and the larger for the fertilizer, and apertures in their bottoms, seed-slides in bearings upon the cross-beam and connected by a slide-rod, a rock-shaft in longitudinal bearings upon one slide provided with lips having inclined inner faces, and a drive-wheel having cam-projections or lips alternating at the edges of its rim, as and for the purpose shown and set forth.

4. In a seeding-machine, the combination of a frame having uprights for the seat for the driver upon its axle and having forwardly-projecting bolts at the forward ends of its side pieces, a tongue pivoted with its slotted rear end to the lower ends of the seat uprights, a cross-beam carrying the seed-boxes and runners and formed with two vertical slots sliding upon the bolts upon the side pieces of the frame, and with an upright at its middle and an arm pivoted at its inner end between the seat uprights and having its forward end secured to the upright of the cross-beam, and a handle for raising or lowering it, as and for the purpose shown and set forth.

In testimony that I claim the foregoing as my own I have hereunto affixed my signature in presence of two witnesses.

JOHN JOSEPH FRAIKIN.

Witnesses:
 FRED V. GRAHAM,
 ANSON L. HASSLER.